US009103335B2

(12) United States Patent
Mohamed

(10) Patent No.: US 9,103,335 B2
(45) Date of Patent: Aug. 11, 2015

(54) SYSTEM AND DEVICES INCLUDING VALVES COUPLED TO ELECTRIC DEVICES AND METHODS OF MAKING, USING, AND OPERATING THE SAME

(75) Inventor: Zahroof Mohamed, Cypress, TX (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 1030 days.

(21) Appl. No.: 12/992,252

(22) PCT Filed: Jun. 1, 2009

(86) PCT No.: PCT/US2009/045864

§ 371 (c)(1), (2), (4) Date: Nov. 11, 2010

(87) PCT Pub. No.: WO2009/158147

PCT Pub. Date: Dec. 30, 2009

(65) Prior Publication Data

US 2011/0070113 A1 Mar. 24, 2011

Related U.S. Application Data

(60) Provisional application No. 61/076,544, filed on Jun. 27, 2008.

(51) Int. Cl.

*H02K 41/02* (2006.01)
*F04B 39/10* (2006.01)
*H02K 7/18* (2006.01)
*F04B 53/10* (2006.01)

(52) U.S. Cl.

CPC ......... *F04B 39/1013* (2013.01); *F04B 53/1022* (2013.01); *F04B 53/1082* (2013.01); *H02K 7/1869* (2013.01)

(58) Field of Classification Search

CPC ...... H02K 7/1869; H02K 7/1876; F01L 3/20; F01L 9/02

USPC ...................... 417/270, 505, 506; 251/64, 65; 137/315.03, 599.07, 529

See application file for complete search history.

(56) References Cited

U.S. PATENT DOCUMENTS

| | | | | |
|---|---|---|---|---|
| 3,485,441 | A | 12/1969 | Eaton | |
| 5,833,211 | A | 11/1998 | Berling | |
| 6,612,539 | B1 * | 9/2003 | Ruehle et al. | 251/64 |
| 7,055,539 | B2 * | 6/2006 | Suzuki | 137/1 |

(Continued)

FOREIGN PATENT DOCUMENTS

| | | |
|---|---|---|
| EP | 0361927 | 4/1990 |
| WO | WO2005012697 | 2/2005 |

OTHER PUBLICATIONS

PCT International Search Report and Written Opinion; Application No. PCT/US2009/045864; Dated Oct. 10, 2009; 14 pages.

*Primary Examiner* — Devon Kramer
*Assistant Examiner* — Patrick Hamo
(74) *Attorney, Agent, or Firm* — Fletcher Yoder, P.C.

(57) ABSTRACT

Systems, methods, and devices are disclosed, including a compressor having a piston and a valve assembly. In some embodiments, the valve assembly includes a check valve having a valve member, a magnet coupled to the valve member, and an electrical conductor near the magnet. The check valve may be configured to change state in response to a change in fluid pressure. The compressor may also have an electric device coupled to the electrical conductor.

12 Claims, 14 Drawing Sheets

CAUSE RELATIVE MOVEMENT OF A MAGNET AND A CONDUCTOR BY MOVING A VALVE MEMBER — 122

INDUCE A CURRENT IN THE CONDUCTOR — 124

STORE ELECTRICAL ENERGY FROM THE CURRENT — 125

(56) References Cited

U.S. PATENT DOCUMENTS

| | | | | |
|---|---|---|---|---|
| 7,506,663 | B2 * | 3/2009 | Thomas et al. | 137/529 |
| 7,533,692 | B2 * | 5/2009 | Walpole et al. | 137/533.27 |
| 7,758,325 | B2 * | 7/2010 | Kabir et al. | 417/521 |
| 7,819,131 | B2 | 10/2010 | Walpole | |
| 8,167,588 | B2 * | 5/2012 | Kabir et al. | 417/419 |
| 2005/0046531 | A1 * | 3/2005 | Moyer et al. | 335/256 |
| 2005/0260089 | A1 * | 11/2005 | Hahn et al. | 417/505 |
| 2006/0147324 | A1 * | 7/2006 | Tanner et al. | 417/411 |
| 2006/0180208 | A1 * | 8/2006 | Walpole | 137/528 |
| 2006/0260701 | A1 * | 11/2006 | Mattes | 137/803 |
| 2007/0227594 | A1 * | 10/2007 | Chaffee | 137/224 |
| 2008/0085201 | A1 * | 4/2008 | Kabir et al. | 417/521 |
| 2008/0223459 | A1 * | 9/2008 | Walpole et al. | 137/528 |
| 2010/0008805 | A1 * | 1/2010 | Mohamed et al. | 417/559 |
| 2010/0040497 | A1 * | 2/2010 | Mohamed | 417/552 |
| 2010/0108163 | A1 * | 5/2010 | Mohamed | 137/625 |
| 2010/0176321 | A1 * | 7/2010 | Burkhart et al. | 251/129.06 |
| 2010/0275772 | A1 * | 11/2010 | Kabir et al. | 92/139 |
| 2012/0152110 | A1 * | 6/2012 | Kabir et al. | 92/139 |
| 2012/0227847 | A1 * | 9/2012 | Mohamed | 137/855 |

* cited by examiner 10
11
11'
12
14
16
18
20
21
21'
23
23'
25
25'
27
27'
29
29'
31
31'
33
33'
35
35'

SYSTEM AND DEVICES INCLUDING VALVES COUPLED TO ELECTRIC DEVICES AND METHODS OF MAKING, USING, AND OPERATING THE SAME

CROSS-REFERENCE TO RELATED APPLICATIONS

This application claims priority to and benefit of PCT Patent Application No. PCT/US2009/045864, entitled "System and Devices Including Valves Coupled to Electric Devices and Methods of Making, Using, and Operating the Same," filed Jun. 1, 2009, which is herein incorporated by reference in its entirety, and which claims priority to and benefit of U.S. Provisional Patent Application No. 61/076,544, entitled "System and Devices Including Valves Coupled to Electric Devices and Methods of Making, Using, and Operating the Same", filed on Jun. 27, 2008, which is herein incorporated by reference in its entirety.

BACKGROUND

This section is intended to introduce the reader to various aspects of art that may be related to various aspects of the present invention, which are described or claimed below. This discussion is believed to be helpful in providing the reader with background information to facilitate a better understanding of the various aspects of the present invention. Accordingly, it should be understood that these statements are to be read in this light, and not as admissions of prior art.

In a variety of systems, fluids are compressed and conveyed by a compressor, and often, these compressors include valves that open and close during a compression cycle. Typically, one set valves open as the compressor draws a low-pressure fluid into a compression chamber, and after the fluid is compressed, another set of valves open to allow the compressed fluid to exit the compressor. During each compression cycle, each set of valves both opens and closes.

The movement of the valves is a form of energy that is typically wasted. In most conventional systems, when a moving valve reaches the end of its travel, it impacts some structure, and the impact dissipates valve's kinetic energy. Typically, the impact converts the kinetic energy to heat and sound that are radiated away from the system. This wasted energy can be substantial. In some systems, hundreds of valves open and close several times per second. Over the course of a year of continuous operation, these systems waste a large amount of energy.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" and the like are intended to mean that there are one or more of the elements. The terms "comprising," "including," "having," and the like are intended to be inclusive and mean that there may be additional elements other than the listed elements. Moreover, the use of "top," "bottom," "above," "below," and variations of these terms is made for convenience, but does not require any particular orientation of the components.

Figure 1:
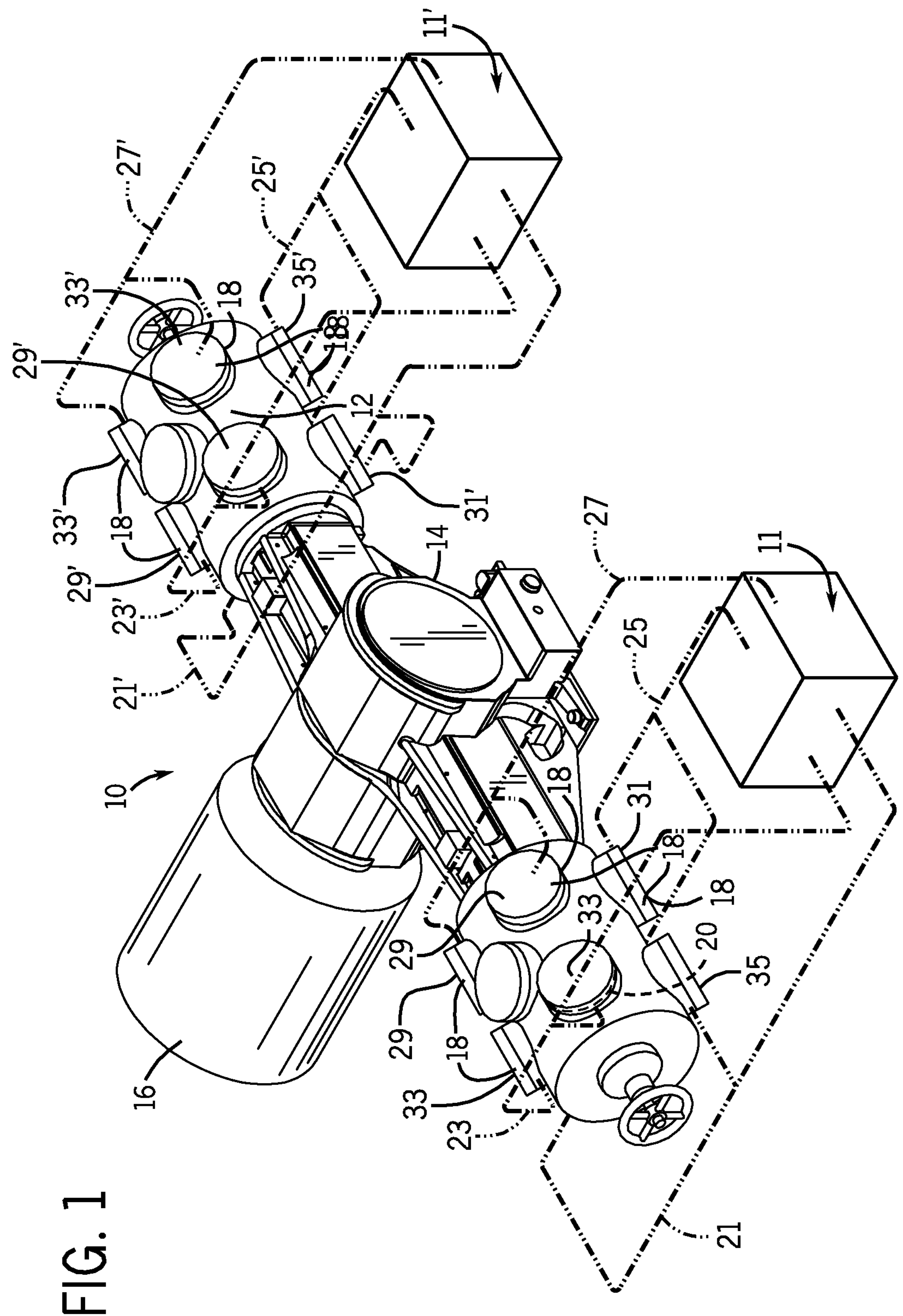
FIG. 1 is a perspective view of a reciprocating compressor including an exemplary energy-scavenging system in accordance with one embodiment of the present invention.

FIG. 1 illustrates an example of a compressor 10 configured to generate or consume electrical energy. In the illustrated embodiment, the compressor 10 includes electric devices 11 and 11' that, as explained below, in some embodiments, converts kinetic energy to electrical energy. The compressor 10 includes a variety of moving parts, and as some of these components move, the electric devices 11 and 11' both scavenge electrical energy and dampens the component's movement. In some embodiments, the electrical devices 11 and 11' may dampen the component's movement by dissipating the resulting electrical energy rather than scavenging the electrical energy. Further, in some embodiments described below, the electric devices 11 and 11' deliver electrical power that generates a force counteracting movement of some components or assisting movement of some components. This may delay or advance the time at which valve members open or close, thereby modulating the compressor's capacity. Multiple embodiments of the electric devices 11 and 11' are described below, after describing the compressor 10 in greater detail.

In this embodiment, the compressor 10 includes a pair of compression cylinders 12 coupled to a frame 14. As discussed in greater detail below, a variety of internal components may be disposed within the cylinders 12 and the frame 14 to compress fluids within the cylinders 12. In one embodiment, the compressor 10 may be used to compress natural gas. However, in other embodiments, the compressor 10 may be configured or utilized to compress other fluids, such as air or other gases. A mechanical power source or driver 16, such as an engine or an electric motor, may be coupled to the compressor 10 to provide mechanical power to the various internal components and to compress the fluid within the cylinders 12. To facilitate access to such internal components, as may be desired for diagnostic or maintenance purposes, openings in the frame 14 may be provided and selectively accessed via removable covers disposed over the openings.

Further, the exemplary cylinders 12 include capped recesses 18 configured to receive valve assemblies, such as valve assembly 20. While only a single valve assembly 20 is illustrated, it will be appreciated that, in various embodiments, additional valve assemblies are included within some or all of the other capped recesses 18. It will also be appreciated that the cylinders 12 may include internal fluid conduits between the recesses 18 and the valve assemblies 20 to facilitate flow of a fluid into and out of the cylinders 12 through such valve assemblies. Additionally, various installation components, such as cages or fasteners, may be employed to facilitate mounting of the valve assemblies 20 within the recesses 18.

In this embodiment, each of the valve assemblies 20 is connected to the electric device 11 (or 11') through one of four phase paths 21, 23, 25, and 27 (or the phase paths 21', 23', 25', or 27'). Each phase path 21, 23, 25, and 27 connects to a group of valve assemblies 29, 31, 33, and 35, and each phase path 21', 23', 25', and 27' connects to a group of valve assemblies 29', 31', 33', and 35'.

Each group 29, 31, 33, and 35 and 29', 31', 33', and 35' includes valve assemblies 20 that move generally simultaneously during the cycle of the compressor 10, which is described below with reference to FIG. 2. For instance, the valve assemblies 20 in groups 31, 31', 35, and 35' are discharge valve assemblies that open in response to an increase in fluid pressure arising from the piston (which is described below with reference to FIG. 2) moving toward their respective sides of the cylinders 12. The valve assemblies 20 in groups 29, 29', 33, and 33' may be suction valves assemblies that open in response to a decrease in fluid pressure arising from the piston moving away from their respective sides of the cylinders 12.

The phase paths 21, 23, 25, 27, 21', 23', 25', and 27' may connect groups of valve assemblies 20 that open and close at generally the same time. For instance, the phase paths 21 and 21' connect to valve assemblies 20 in groups 35 or 35'; the phase paths 23 and 23' connect to valve assemblies 20 in groups 33 or 33'; the phase paths 25 and 25' connect to valve assemblies 20 in groups 31 or 31'; and the phase paths 27 and 27' connect to valve assemblies 20 in groups 29 or 29'.

These valve assemblies 20 are described below with reference to FIGS. 4-8. The valve assemblies 20 that open during a compression stroke are referred to as "discharge valves," and the valve assemblies that open during a suction stroke are referred to as "suction valves." Thus, the present embodiment includes four phase paths 21, 23, 25, and 27 (or 21', 23', 25', or 27') for each piston and one phase path 21, 23, 25, and 27 (or 21', 23', 25', or 27') for each type of valve assembly, suction or discharge, associated with each piston.

In the illustrated embodiment, the groups of valve assemblies 29 and 33 are disposed on a top half of the cylinders 12, and the groups of valve assemblies 31 and 35 are disposed on a bottom half of the cylinders 12. In other embodiments, though, the groups may by intermingled around the cylinders 12.

Although the exemplary compressor 10 is illustrated as a two-throw reciprocating compressor, other compressor configurations may also employ and benefit from the presently disclosed techniques. For instance, in other embodiments, the compressor 10 may include a different number of cylinder throws, such as a single-throw compressor, a four-throw compressor, a six-throw compressor, a couple-free reciprocating compressor, a screw compressor, or the like. Further, other variations are also envisaged, including variations in the length of stroke, the operating speed, and the size, to name but a few.

Figure 2:
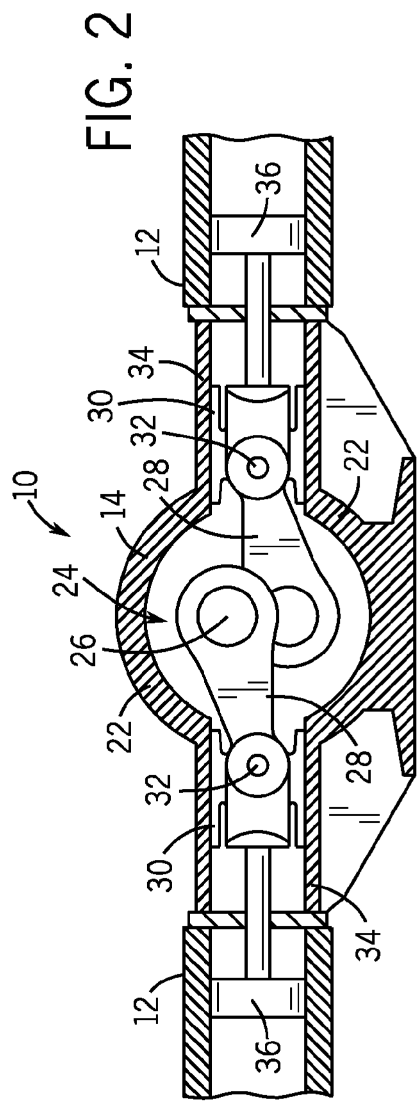
FIG. 2 is an axial, cross-section view of the exemplary compressor of FIG. 1, illustrating internal components of the compressor in accordance with one embodiment of the present invention.

A cross-section view of the exemplary compressor 10 is provided in FIG. 2, which illustrates a number of exemplary internal components of the compressor of FIG. 1. In the presently illustrated embodiment, the frame 14 of the exemplary compressor 10 includes a hollow central body or housing 22 that generally defines an interior volume 24 in which various internal components may be received, such as a crankshaft 26. In one embodiment, the central body 22 may have a generally curved or cylindrical shape. It should be noted, however, that the central body 22 may have other shapes or configurations in full accordance with the present techniques.

In operation, the driver 16 rotates the crankshaft 26 supported within the interior volume 24 of the frame 14. In one embodiment, the crankshaft 26 is coupled to crossheads 30 via connecting rods 28 and pins 32. The crossheads 30 are disposed within crosshead guides 34, which generally extend from the central body 22 and facilitate connection of the cylinders 12 to the compressor 10. In one embodiment, the compressor 10 includes two crosshead guides 34 that extend generally perpendicularly from opposite sides of the central body or housing 22, although other configurations are also envisaged. As may be appreciated, the rotational motion of the crankshaft 26 is translated via the connecting rods 28 to reciprocal linear motion of the crossheads 30 within the crosshead guides 34.

As noted above, the cylinders 12 are configured to receive a fluid for compression. The crossheads 32 are coupled to pistons 36 disposed within the cylinders 12, and the reciprocating motion of the crossheads allows compression of fluid within the cylinders 12 via the pistons 36. Particularly, as a piston 36 is driven forward (i.e., outwardly from central body 22) into a cylinder 12, the piston 36 forces fluid within the cylinder into a smaller volume, thereby increasing the pressure of the fluid. A discharge valve, such as valve assembly 20, may then open to allow the pressurized or compressed fluid to exit the cylinder 12. The piston 36 may then stroke backward, and additional fluid may enter the cylinder 12 through a suction valve, which may also comprise a valve assembly 20, for compression in the same manner described above. Further, as will be appreciated, the cylinders 12 can be configured to facilitate fluid compression on both the forward and the backward strokes of the piston 36. For instance, as the piston 36 moves forward in the manner discussed above to compress fluid on one side of the piston, additional fluid may be introduced into the cylinder on the opposite side of the piston. Such fluid would then be compressed on the backward stroke of the piston 36.

Figure 3:
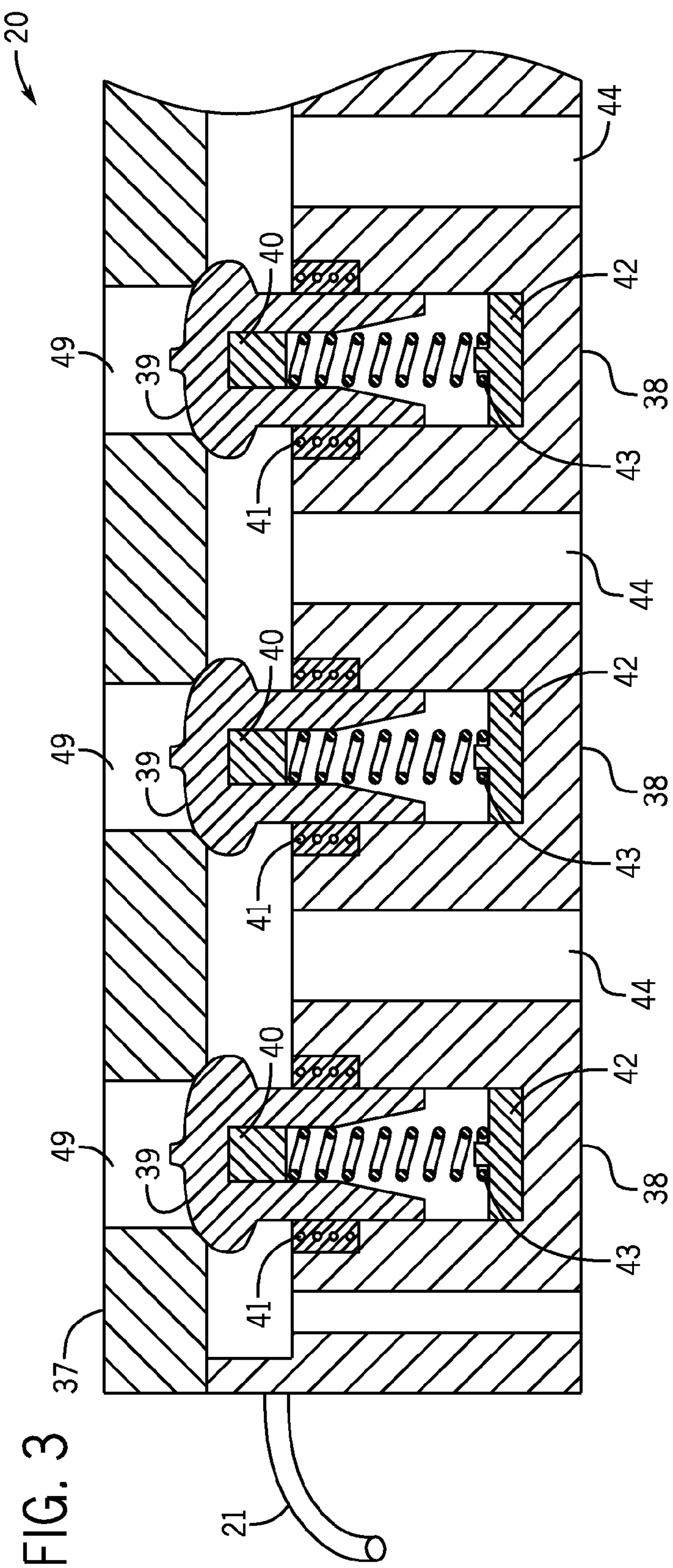
FIG. 3 is a cross-section view of an exemplary poppet valve assembly in accordance with one embodiment of the present invention.

FIG. 3 illustrates an example of a valve assembly 20. In this embodiment, the valve assembly 20 includes a seat 37, a guard 38, and a plurality of poppets 39, magnets 40, coils 41, shoes 42, and springs 43. The poppets 39 are biased against openings 49 through the seat 37 by the springs 43. The coil 41 is disposed around the poppet 39 and adjacent the magnet 40, such that the magnet 40 passes through the coil 41 as the poppet 39 opens and closes. The coil 41 may be disposed in a plastic body or bushing that is recessed into an annular shelf in the guard 38. The ends of the coil 41 may connect to the phase path 21. The guide plate 38 includes a plurality of openings 44 that are in fluid communication with the openings 49 when the poppet opens.

In operation, a difference in fluid pressure between the opening 49 and the opening 44 forces the poppet 39 away from the seat 37, opening the valve 20. The poppet 39 may remain generally closed until the difference in fluid pressure exceeds a threshold, and the force of the spring 43 is overcome. Depending on the orientation of the valve 20, e.g., whether it is a suction valve or a discharge valve, fluid may flow from the opening 49 to the opening 44 or vice versa. When the difference in pressure drops below the threshold, the spring 43 drives the poppet back toward the seat 37, closing the valve 20.

As the magnet 40 moves past the coil 41, it induces a current in the coil 41. This current may be used for a variety of purposes, some of which are described below. In some embodiments, a resistor coupled to the phase path 21 may dissipate the electrical energy from the current, and the work that the poppet 39 performs driving the current through the resistor may dampen the movement of the poppet 39, absorbing its kinetic energy. Dampening the movement of the poppet 39 is believed to reduce the mechanical stress that the poppet 39 encounters upon impact at the ends of its travel between the open and closed positions. Lower mechanical stress is believed to extend the life of the poppet 39 and lower maintenance costs.

Figure 4:
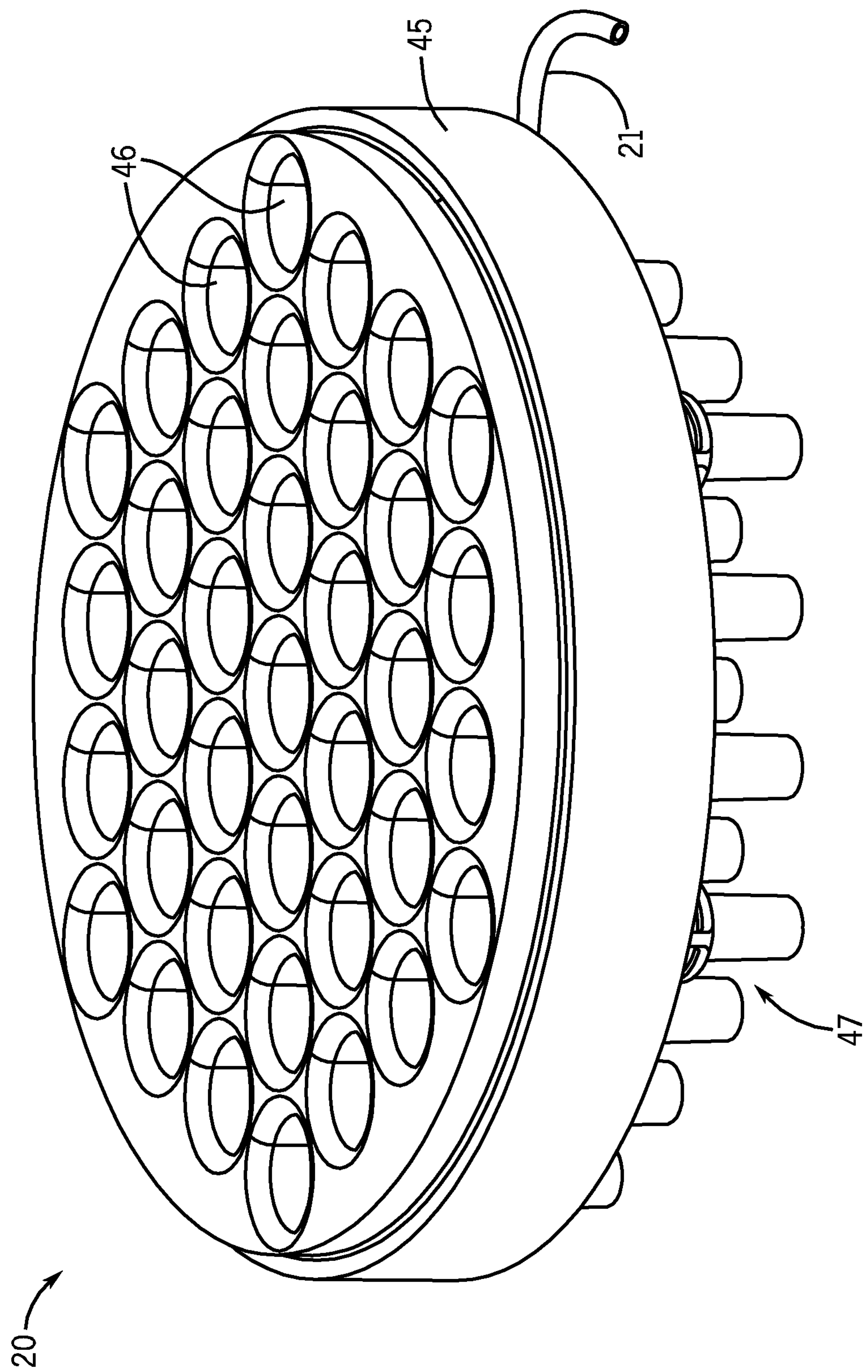
FIG. 4 is a perspective view of another exemplary poppet-valve assembly in accordance with one embodiment of the present invention.

A perspective view of another exemplary valve assembly 20 is provided in FIG. 4. In this embodiment, the valve assembly 20 includes a portion of the phase path 21 (though other valve assemblies 20 may include a portion of one of the other phase paths 23, 25, or 27) and a pressure plate 45 having a number of fluid ports 46, which allow a fluid, such as natural gas, to flow through the valve assembly 20. The pressure plate 45 is formed from metal, or some other suitable high-strength material. As discussed in greater detail below, the exemplary valve assembly 20 also includes a plurality of poppet cage assemblies 47 (e.g., poppets of the type referred to as "zips") that each generate or consume electrical energy conveyed via the phase path 21.

Figure 5:
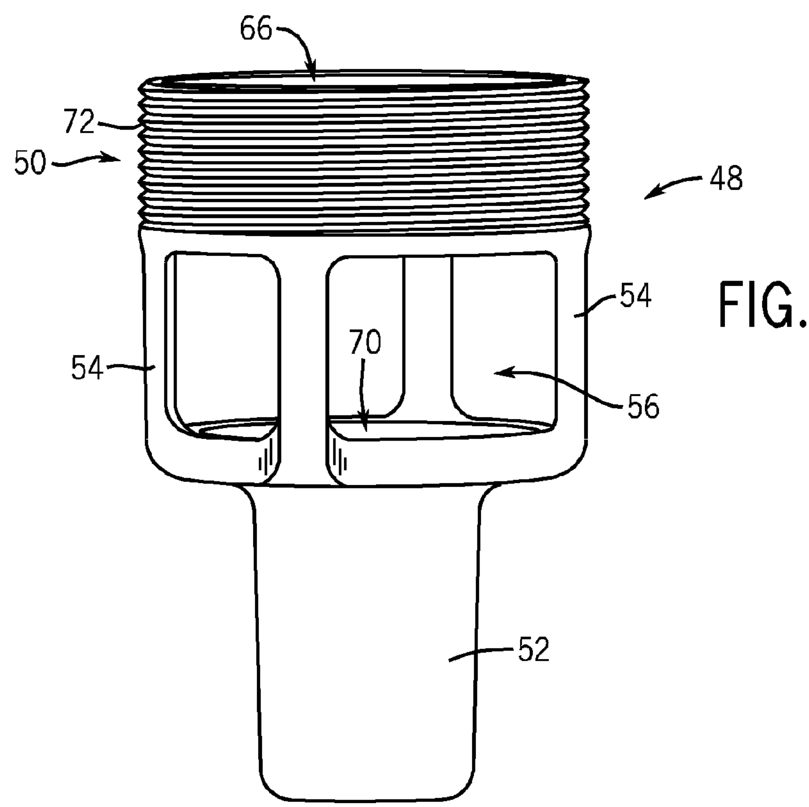
FIG. 5 is a front-elevation view of an exemplary cage of the poppet-valve assembly of FIG. 4 in accordance with one embodiment of the present invention.
Figure 6:
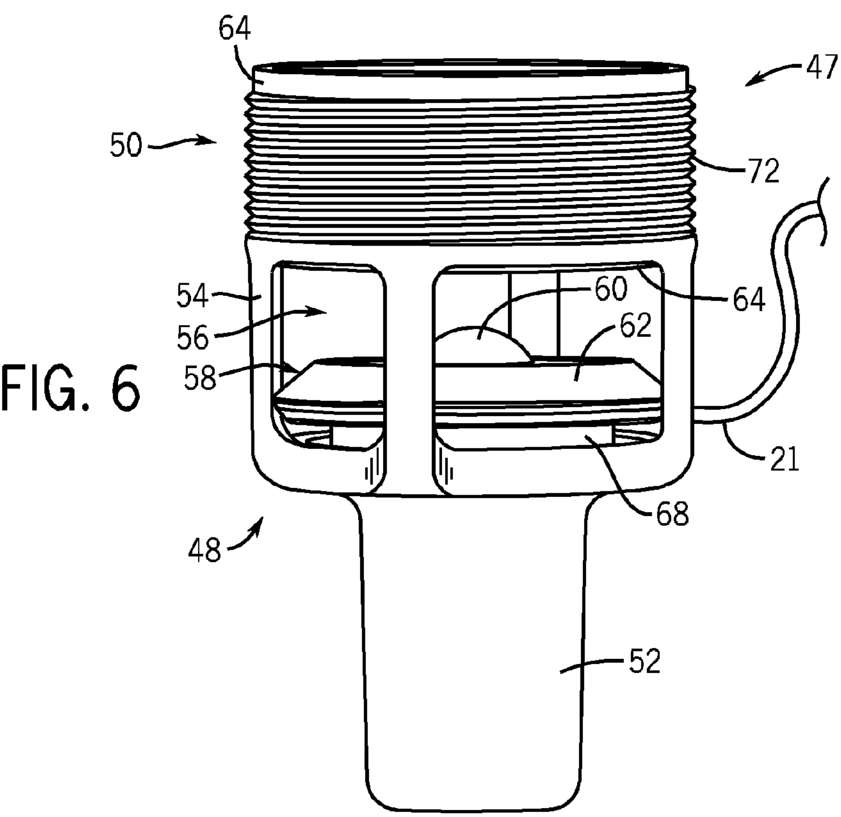
FIG. 6 is a front-elevation view of an exemplary poppet-cage assembly of the poppet-valve assembly of FIG. 4, in which the exemplary poppet-cage assembly includes several components disposed within the cage of FIG. 5 in accordance with one embodiment of the present invention.

Certain features of the poppet cage assemblies 47 may be better understood with reference to FIGS. 5 and 6. Particularly, FIG. 5 is a front-elevation view of an embodiment of a poppet cage 48 alone, while FIG. 6 is a front-elevation view of an embodiment of a poppet-cage assembly 47 removed from the pressure plate 45 and including a number of components disposed within the cage 48, in accordance with one embodiment of the present invention. The cage 48 includes a mounting portion 50 and a receiving portion 52 that includes one or more connecting arms 54. In certain embodiments, the cage 48 is formed from metal, although the cage 48 may be formed from other suitable materials in other embodiments. Additionally, the cage 48 may be formed through any suitable manufacturing process. For instance, in one embodiment, a metallic cage 48 is formed through a metal injection molding process.

The mounting portion 50, the receiving portion 52, and the connection arms 54 generally define region 56 (e.g., an interior space) in which a poppet 58 may be disposed. In some embodiments, such as the embodiment illustrated in FIGS. 5 and 6, each cage 48 is configured to receive only a single poppet 58 therein. In the presently illustrated embodiment, the poppet 58 includes a central body 60 coupled to a poppet head 62. In certain embodiments, the poppet head 62 is formed from metal through a suitable manufacturing process, such as coining, stamping, machining, or the like. Further, in some embodiments, the central body 60 is an injection molded plastic. It should be noted, however, that one or both of the central body 60 and the poppet head 62 may be formed from other suitable materials, such as ceramic, metal, or plastic, or through other suitable manufacturing processes, other than those described above.

The exemplary poppet-cage assembly 47 also includes a seat 64 disposed within a bore 66 of the mounting portion 50, and an impact bushing 68 disposed in a recess 70 of the receiving portion 52. As discussed in greater detail below, during operation of the poppet-cage assembly 47, the poppet head 62 contacts the seat 64 while closing, and contacts impact bushing 68 upon opening. The seat 64 and impact bushing 68 may be formed from the same material as each other, or from different materials. In some embodiments, the one or more materials from which the impact bushings are formed are selected based on their impact absorption properties. For instance, in one embodiment, the seat 64 and impact bushing 68 are made of plastic, and may be formed through an injection molding process or by some other suitable manufacturing process. As will be appreciated, however, the seat 64 and impact bushing 68 may be formed from suitable materials other than plastic. For instance, in some embodiments, such as an embodiment including a reinforced plastic poppet head 62, it may be desirable for the seat 64 to be formed of metal. Also, in some embodiments, the one or more materials from which the seat 64 or impact bushing 68 are formed has a strength or stiffness less than that of the poppet head 62 to reduce wear on the poppet 58 during operation of the valve assembly 20.

Figure 7:
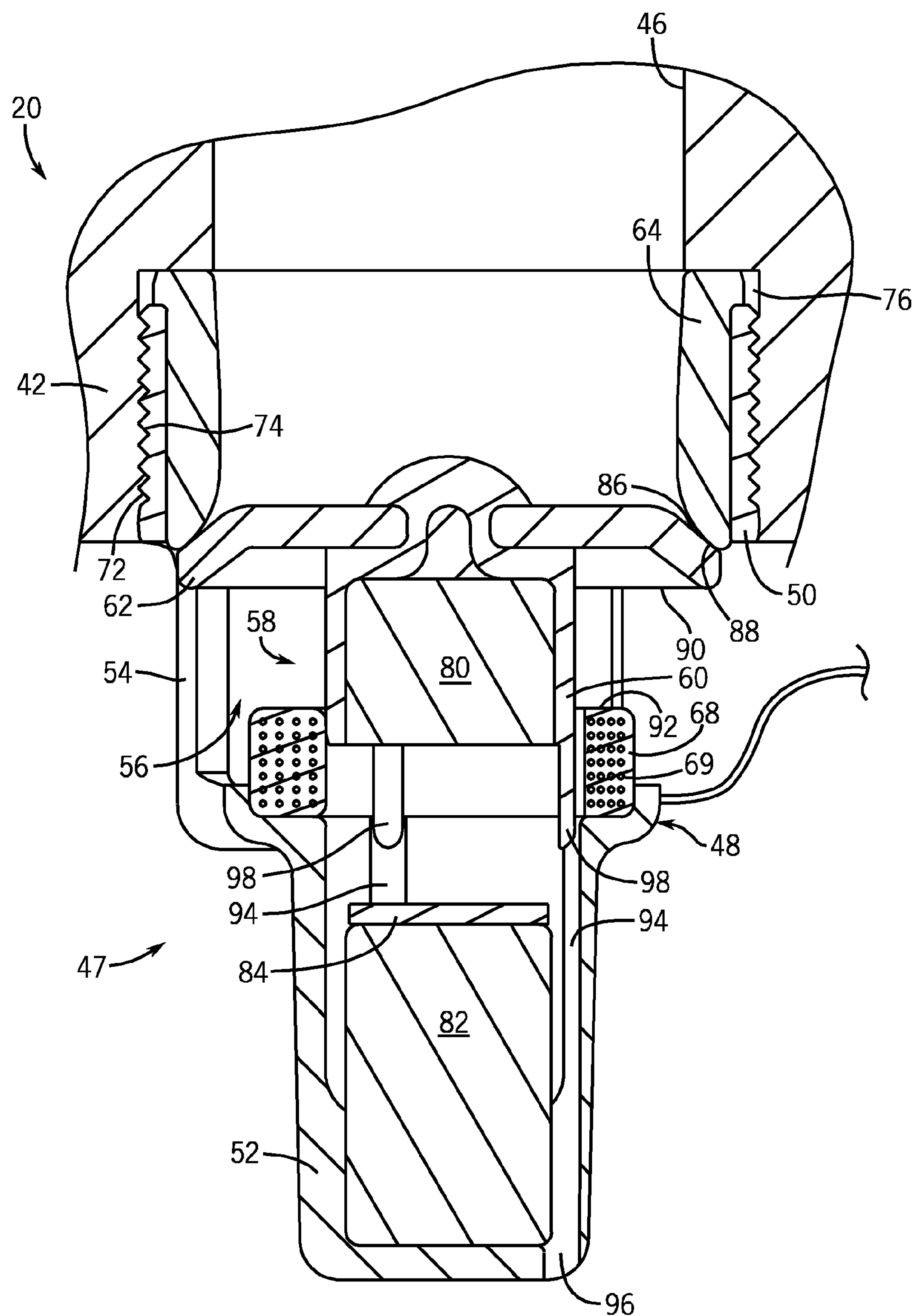
FIG. 7 is a partial, cross-section view of the exemplary valve assembly of FIG. 4, illustrating various internal components of the valve assembly, including a poppet in a closed position in accordance with one embodiment of the present invention.

In this embodiment, the impact bushings 68 include a coil 69, as illustrated by FIG. 7. The illustrated coil 69 connects at one end to the phase path 21 (or one of the other phase paths 23, 25, or 27) and at the other end to a common current sink, such as ground. In other embodiments, the phase paths 21, 23, 25, and 27 include two leads with one lead connected to each end of the coil 69. In this embodiment, the grounded end of the coil 69 is connected to the cage 48, and the cage 48 is grounded via the pressure plate 45. In other embodiments, the phase paths 21, 23, 25, and 27 may each include two conductors, and these two conductors may connect to each end of the coil 69. The impact bushing 68 may be injection molded around the coil 69 by inserting the coil 69 in a mold for the impact bushing 68 prior to injecting molding. Alternatively, or additionally, all or part of the coil 69 may be disposed around the impact bushing 68 or other portions of the poppet-cage assembly 47. In this embodiment, the coil 69 includes more than 28 turns, but in other embodiments, the coil 69 may have more or fewer turns. The coil 69 is generally concentric about the central body 60, and it overlaps a substantial portion or all of the travel of the magnet 80, a path that is described below by comparing FIGS. 7 and 8. That is, in this embodiment, a portion of the coil 69 is adjacent the magnet 80 both when the magnet 80 is at the top of its travel and when the magnet is at the bottom of its travel.

It should also be noted that while certain embodiments of the valve assembly 20 may comprise the pressure plate 45 and one or more poppet cage assemblies 47 in addition to other components, other embodiments in accordance with the present techniques may consist of, or consist essentially of, the pressure plate 45 and the one or more poppet cage assemblies 47. Similarly, while a poppet-cage assembly 47 of some embodiments may comprise other components in addition to the cage 48, the poppet 58, the seat 64 and impact bushing 68, the coil 69, the magnets 80 and 82, or the spring 43, in other embodiments the poppet-cage assembly 47 consists of, or consists essentially of, these elements or some sub-combination thereof. Further, while certain embodiments of the valve assembly 20 include a plurality of poppet cage assemblies 47, it should be noted that other embodiments may instead include only a single poppet-cage assembly 47 in full accordance with the present techniques.

Figure 8:
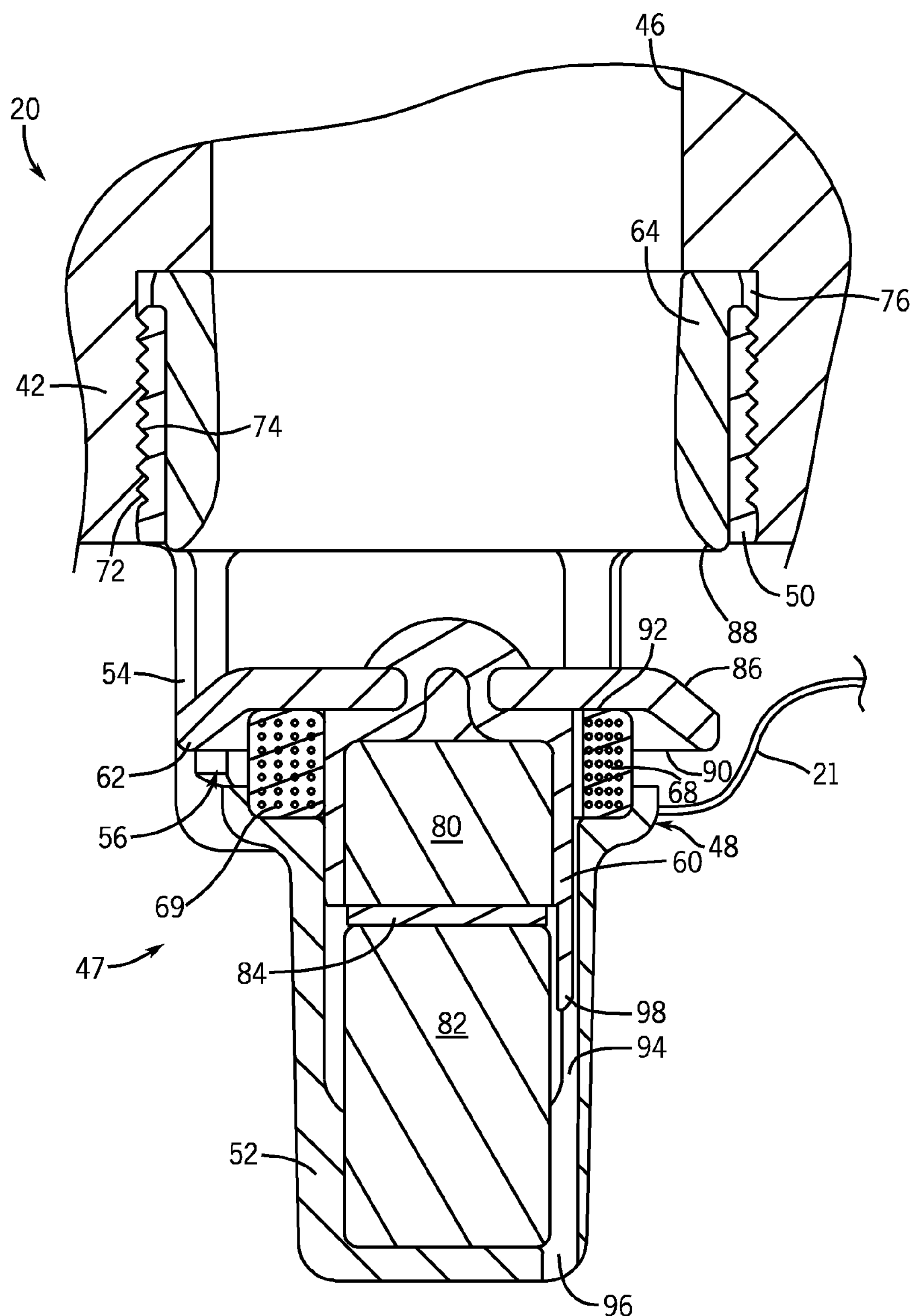
FIG. 8 is a partial, cross-section view of the exemplary valve assembly illustrated in FIG. 7, depicting the poppet in an open position in accordance with one embodiment of the present invention.

Additional features of an exemplary valve assembly 20 are illustrated in the cross-section views of FIGS. 7 and 8. In the presently illustrated embodiment, the pressure plate 45 includes a recess 76 formed at an end of a fluid port 46 and is configured to receive a poppet-cage assembly 47. In some embodiments, the recess 76 is concentric, or substantially concentric, with the fluid port 46 to facilitate flow of a fluid from the fluid port 46, through the seat 64, and into the region 56 when the poppet 58 is opened. In some embodiments, the recess 76 includes a threaded surface 74 configured to engage the threaded surface 72 of the cage 48. Other or additional attachment mechanisms, however, could be provided in full accordance with the present techniques. For instance, in various embodiments, the pressure plate 45 may include externally threaded extensions configured to receive internally threaded mounting portions 50 of cages 48, the cages 48 may be coupled to the pressure plate 45 via a fastener, or the like. Additionally, while the mounting portion 50 of the cage 48 is directly coupled to the pressure plate 45 in certain embodiments, the mounting portion 50 of other embodiments may be coupled to the pressure plate 45 via one or more intermediate members.

As will be appreciated, a poppet valve generally includes one or more biasing components configured to apply a biasing force to the poppet 58. In the embodiment illustrated in FIGS. 7 and 8, magnets 80 and 82 are disposed in the poppet 58 and the receiving portion 52 of the cage 48 to provide such a biasing force. As may be seen in the presently illustrated embodiment, a button or washer 84 may be provided within the receiving portion 52 of the cage 48 to prevent contact between the magnets 80 and 82. The button 84 may be formed of plastic or some other suitable material.

In other embodiments, internal channels or grooves 94 may be formed on interior surfaces of the cage 48 and the impact bushing 68 to allow a fluid entering a lower portion of the cage 48 to escape through the grooves 94 and a vent port 96. Still further, in one embodiment, the central body 60 of the poppet 58 includes one or more anti-rotation features, such as fins 98, which cooperate with the channels 94 to prevent rotation of the poppet 58 within the poppet-cage assembly 47. In alternative embodiments, the central body 60 may include other anti-rotation features in place of, or in addition to, the fins 98. For example, the central body 60 may instead include one or more grooves configured to mate with internally protruding ribs formed on the impact bushing 68 or the cage 48.

In operation, the opposing forces on the magnets 80 and 82 generally result in a force on the poppet 58 toward the seat 64. Conversely, an opposing force will be applied to the poppet 58 when the pressure above the poppet head 62 (i.e., the region within the fluid port 46 and the impact bushing 64) exceeds the pressure in the region 56 below the poppet head 62. As will also be appreciated, when the biasing force is greater than the opposing force, an upper surface 86 of the poppet head 62 will generally engage a complimentary surface 88 of the seat 64 to form a seal between these two surfaces, as illustrated in FIG. 7. Upon a sufficient pressure differential between the region within the seat 64 and the region 56, the opposing force resulting from such pressure differential will exceed the biasing force applied by the magnets 80 and 82 (or the spring 43), as well as any frictional forces, causing the poppet 58 to move into the open position illustrated in FIG. 8 and allowing fluid to flow from the fluid port 46, through the seat 64, and past the poppet-cage assembly 47. In this position, a lower surface 90 of the poppet head 62 abuts a surface 92 of the impact bushing 68. It should be noted, however, that in other embodiments the stem or skirt of the central body 60 of the poppet 58 may be configured to impact the button 84 when the poppet 58 moves into an open position. Such contact between the central body 60 and the button 84 may be in addition to, or instead of, contact between the poppet head 62 and an impact bushing 68.

As the poppet 58 moves between the closed position (FIG. 7) and the open position (FIG. 8), the magnet 80 induces a current in the coil 69. The current arises from both the time-varying magnetic field produced by the moving magnet 80 and the position of a conductor, such as the coil 69, within the time-varying magnetic field. The coil 69 conducts this current through the portion of the phase path 21, which carries the current to or from the electric device 11. The direction of the current through the coil 69 changes depending on the direction that the magnet 80 is moving. Thus, the current flows one direction when the poppet-cage assembly opens and the opposite direction when the poppet-cage assembly closes. As explained below, in some embodiments, this current is rectified, filtered, and stored by the electric device 11.

Assuming the coil 69 is connected to a load, such as a resistor or a less-than-fully-charged battery, inducing the current in the coil 69 establishes a force resisting movement of the magnet 80. This force is referred to as a "Lorentz force." The Lorentz force slows movement of the poppet 58 and reduces loads applied during impact with either the seat 64 or the impact bushing 68. In some systems, this effect is referred to as "regenerative braking," though not all embodiments are regenerative; some embodiments dissipate the electrical energy, e.g., with a resistor, to dampen movement. The reduction in impact speed is believed to extend the life of the poppet 58. Further, in an embodiment described below with reference to FIG. 14, the electric device 11 drives a current through the coil 69 to accentuate this effect or to partially or substantially entirely control the poppet. As is explained, the electric device 11 may sense that the poppet 58 is moving or is about to move and drive a current through the coil 69 in a direction selected to resist movement of the coil 69. Such an actuator may by synchronized with the movement of the poppet 58 with information received from a sensor that indicates the position of the crankshaft, and the actuator may delay or advance the closing or opening of the poppet 58 by counteracting or supplementing forces applied to the poppet 58 with fluid pressure.

Figure 9:
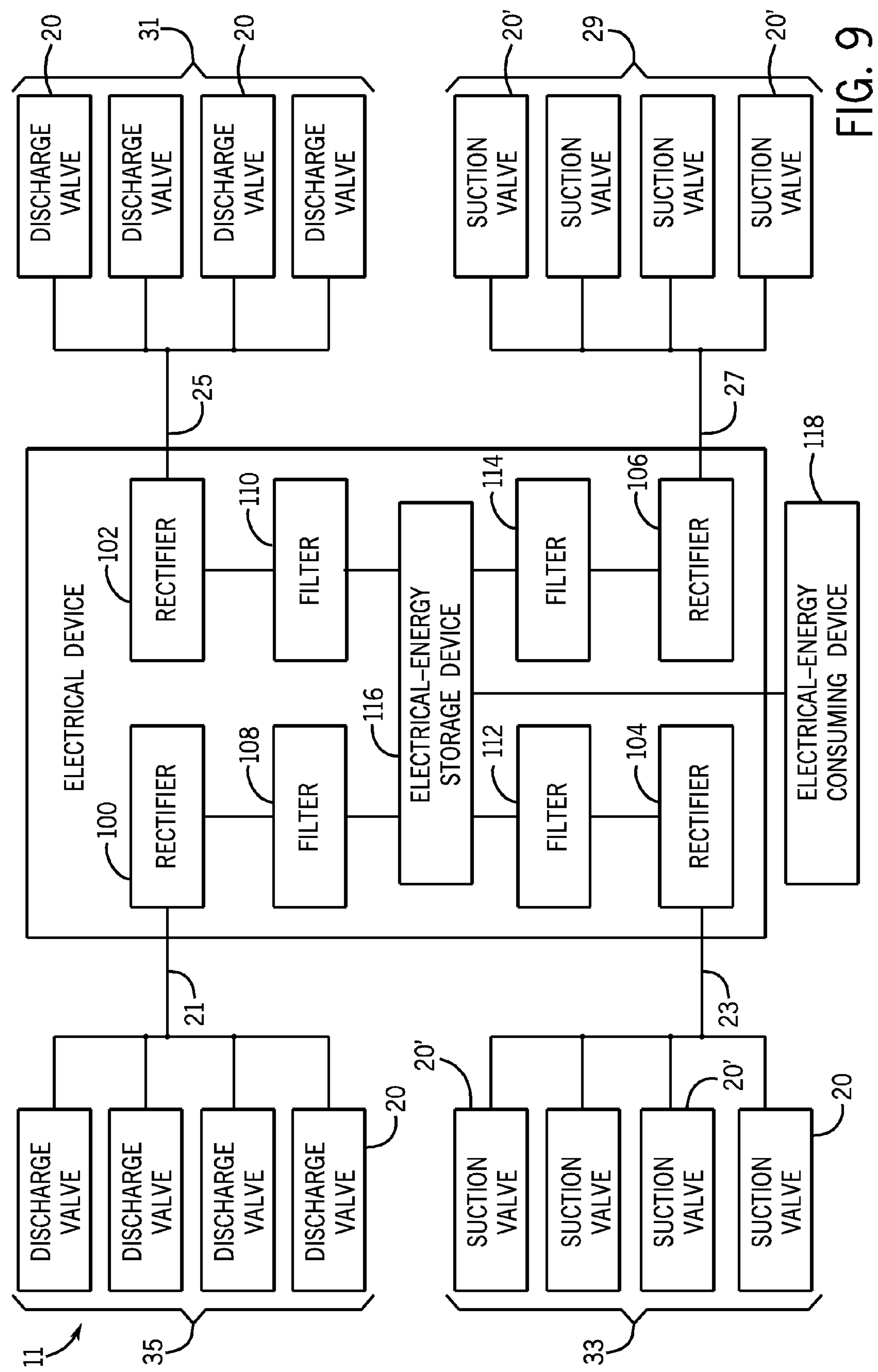
FIG. 9 is a diagram of an exemplary energy-scavenging system in accordance with one embodiment of the present invention.

FIG. 9 illustrates features of an embodiment of the electric device 11 (or 11'). The illustrated electric device 11 includes four rectifiers 100, 102, 104, and 106, four low-pass filters 108, 110, 112, and 114, and an electrical-energy storage device 116. Each of the four rectifiers 100, 102, 104, and 106 is connected to one of the four low-pass filters 108, 110, 112, and 114, and each of the four low-pass filters 108, 110, 112, and 114 is connected to the electrical-energy storage device 116. Additionally, the four rectifiers 100, 102, 104, and 106 are respectively connected to one of the four phase paths 21, 25, 23, and 27. The phase paths 21, 25, 23, and 27, in this embodiment, connect to either discharge valves 20 or suction valves 20'. Specifically, as explained above, the phase paths 21 and 25 connect to discharge valves 20 in groups 35 and 31, respectively, and the phase paths 23 and 27 connect to suction valves 20' in groups 33 and 29, respectively. The discharge valves 20 and the suction valves 20' may both include the valve assembly 20 illustrated by FIG. 4, but the suction valves 20' may be oriented in an opposite direction with respect to the direction of fluid flow. In other embodiments, the suction valves 20' may include a different type of valve from the discharge valves 20. In some embodiments, both valves 20 and 20' may include other types of check valves (i.e., a fluid pressure actuated one-way valve).

In this embodiment, the electrical-energy storage device 116 is a battery, but in other embodiments, it may include a bank of capacitors or other type of energy-storage device. The illustrated electrical-energy storage device 116 connects to a device 118 that consumes electrical energy, such as a light, a compressor controller, compressor monitoring circuitry, the mechanical power source 16, or a grid into which power is sold.

Figure 10:
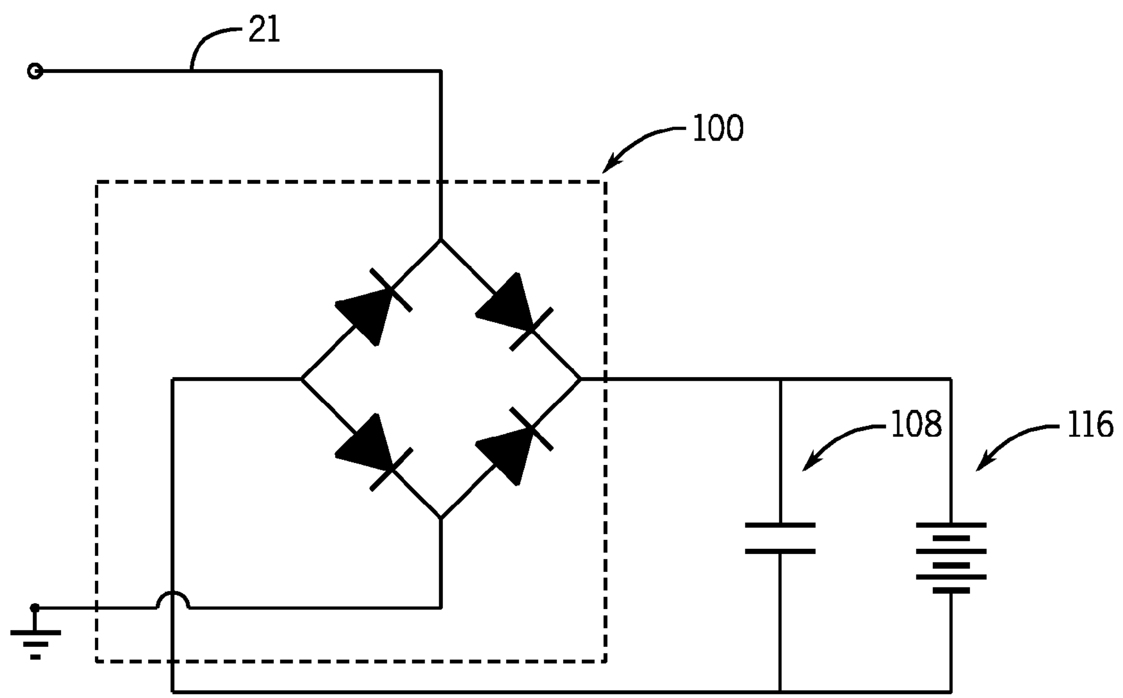
FIG. 10 is a circuit diagram of a portion of the energy-scavenging system of FIG. 9 in accordance with one embodiment of the present invention.

FIG. 10 is a circuit schematic that illustrates one example of the rectifier 100, the filter 108, and the electrical-energy storage device 116. In this embodiment, the rectifier 100 is a full-bridge rectifier having four diodes. In other embodiments, the rectifier 100 may be a half-bridge rectifier or a switch configured to reroute current to the electrical-energy storage device 116 based on the direction of current flow. One terminal of the rectifier 100 is connected to the phase paths 21, and the other terminal may be connected either to ground or one end of the coils 69. The other terminals of the rectifier 100, in this embodiment, are connected to the low pass filter 108 and the electrical-energy storage device 116. The illustrated filter 108 is a low-pass filter having a capacitor connected in parallel with the electrical-energy storage device 116. In other embodiments, other types of filters may be used, such as a serially connected inductor. Some embodiments may not include the filter 108, which is not to suggest that any other feature discussed herein may not also be omitted. The illustrated electrical-energy storage device 116 is a battery, such as a nickel-metal hydride battery, a lead-acid battery, or a lithium-ion battery.

Figure 11:
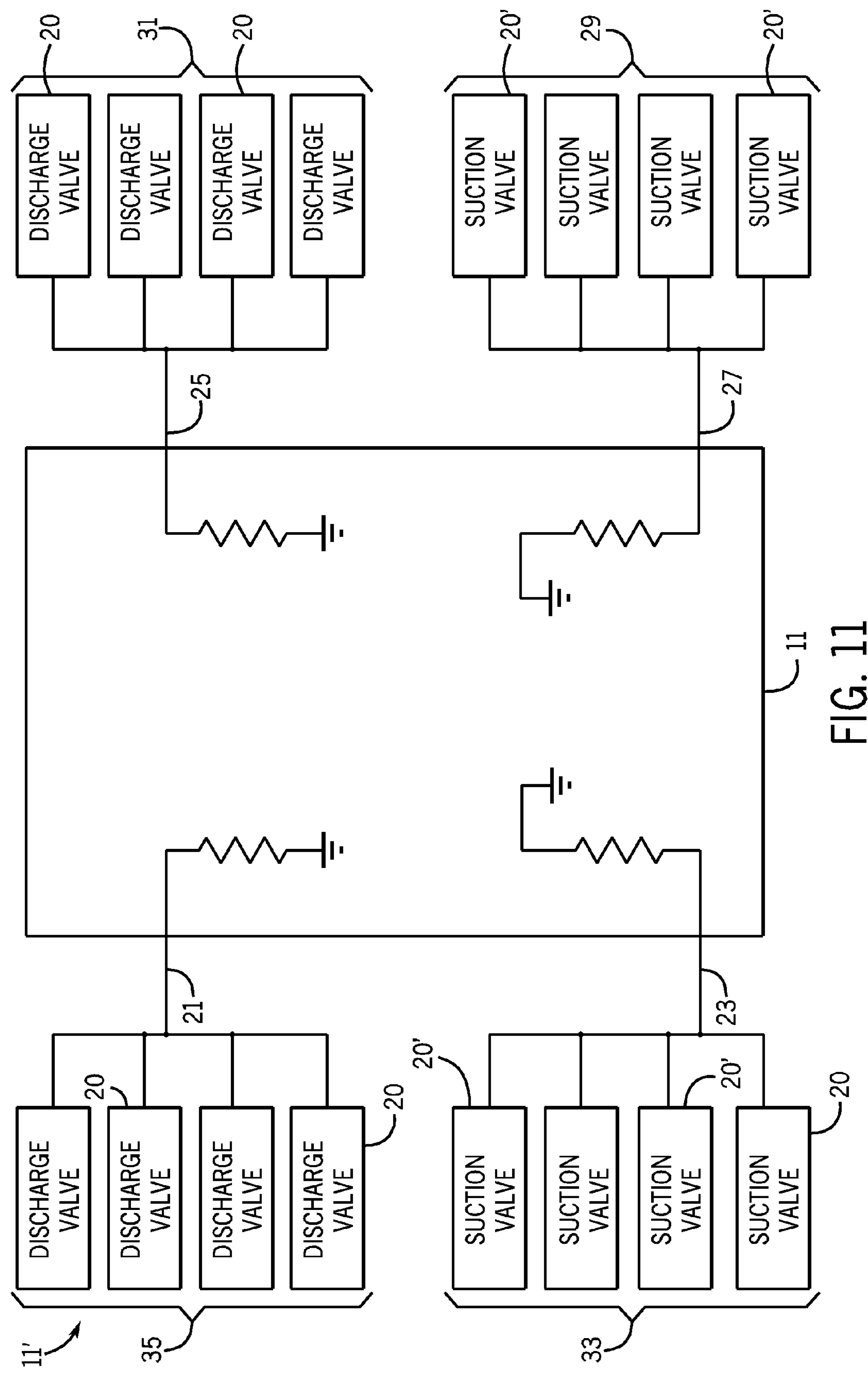
FIG. 11 is diagram illustrating a passive-damping system in accordance with one embodiment of the present invention.

FIG. 11 illustrates an example of the electric device 11 or 11' that forms a type of passive damping system. In this embodiment, each of the phase paths 21, 23, 25, and 27 couples to a resistor. Movement in each of the valves 20 or 20' induces current in the phase paths 21, 23, 25, and 27, and this current is dissipated by the resistors. Thus, the kinetic energy of components in the valves 20 and 20' may be converted to electrical energy in the phase paths and then to heat energy in the resistors. In some embodiments, active or passive cooling may dissipate this heat energy.

Figure 12:
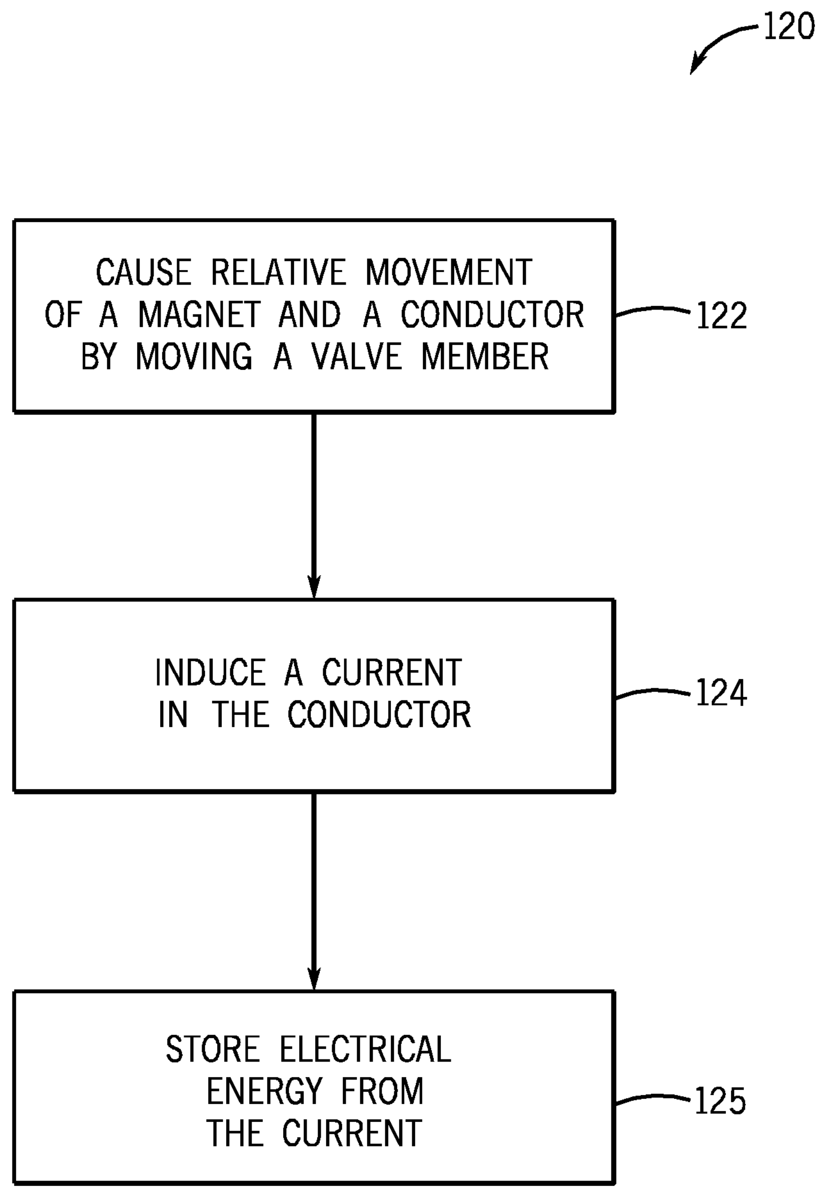
FIG. 12 is a flowchart illustrating an exemplary energy-scavenging process in accordance with one embodiment of the present invention.

FIG. 12 illustrates an example of an energy-scavenging process 120. The illustrated process begins with causing relative movement of magnet and a conductor by moving a valve member, as illustrated by block 122. The valve member may be any of a variety of types of valve members, including a ball in a ball valve, a flap in a butterfly valve, the moving portion of a check valve (e.g., a poppet head), a ring in a moppet, or the like. Moving the valve member may include moving the valve member as a result of a change in fluid pressure across the valve member. For example, in some of the previously described embodiments, opening a discharge valve includes increasing a fluid pressure (though opening the discharge valve may result in a decrease in fluid pressure after it is open), and opening a suction valve includes decreasing a fluid pressure.

Next in the process 120, a current is induced in the conductor, as illustrated by block 124. In some embodiments, the conductor is a coil, and the magnet is moved partially or entirely through the coil. The magnet may be directly or indirectly connected to the valve member. For example, the magnet may be affixed to the valve member, or the magnet may be coupled to the valve member by a mechanical linkage, such as a lever. In some embodiments, multiple magnets are coupled to the valve member, and each of the magnets is moved through a coil. The movement of the magnet may take a variety of forms. For instance, the magnet may twist, translate generally linearly, follow a generally curved path, orbit an axis, or a combination thereof.

Finally, in this embodiment, the electrical energy from the current is stored, as illustrated by block 126. Storing the electrical energy may include charging a battery or a capacitor. Storing may also include changing the form of the electrical energy from alternating current to direct current by rectifying and filtering the current. In other embodiments, the electrical energy is consumed immediately.

Figure 13:
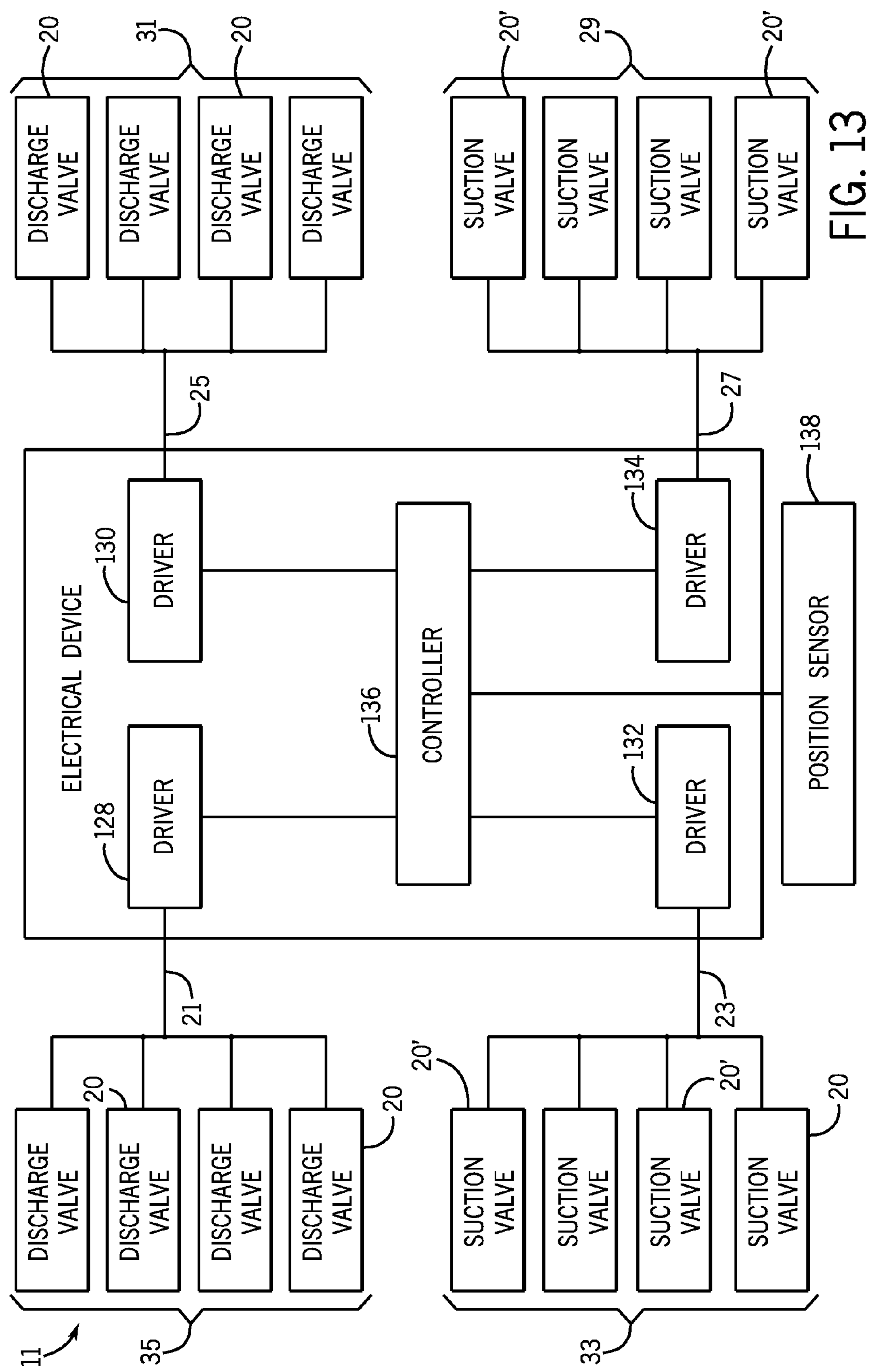
FIG. 13 is a representation of an actuation system in accordance with one embodiment of the present invention.

FIG. 13 illustrates another example of the electric device 11 (or 11'). In this embodiment, the electric device 11 is an actuation system that includes drivers 128, 130, 132, and 134, and a controller 136. Each of the drivers 128, 130, 132, and 134 has an output connected to one of the phase paths 21, 25, 23, and 27, respectively. The drivers 128, 130, 132, and 134 are configured to assert a voltage on the phase paths 21, 23, 25, and 27 in response to a signal from the controller 136. Accordingly, an input of each of the drivers 128, 130, 132, and 134 is also connected to the controller 136.

In this embodiment, the controller 136 is connected to a position sensor 138. The illustrated position sensor 138 is a device configured to indicate generally when the valves 20 and 20' are going to open or close or are opening and closing. In some embodiments, the position sensor 138 may indicate the position of the mechanical driver 16, the crankshaft 26, or the pistons 36, or the position sensor 138 may indicate some measure of the pressure within the cylinders 12. In certain embodiments, the position sensor 138, like other components discussed herein, may be omitted, and the controller 136 may sense the movement of the valves 20 or 20' by monitoring voltages of, or currents induced on, the phase paths 21, 23, 25, and 27.

Figure 14:
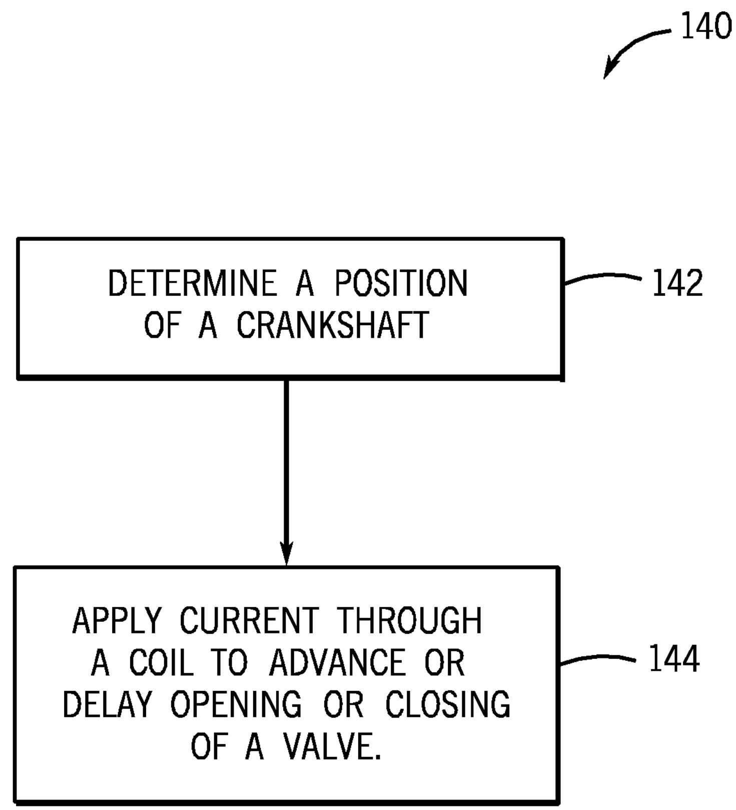
FIG. 14 is a flowchart illustrating an actuation process in accordance with one embodiment of the present invention.

In operation, the electric device 11 executes an exemplary energy-scavenging process 140 illustrated by FIG. 14. The energy-scavenging process 140 includes determining whether a valve member is being moved by a fluid pressure, as illustrated by block 142. Determining whether a valve member is being moved by a fluid pressure may include monitoring the fluid pressure, monitoring the position of a component that affects the fluid pressure, or directly monitoring the position or velocity of the valve member.

If the valve member is being moved, its movement is resisted by driving a current through a coil adjacent a magnet coupled to the valve member, as illustrated by block 144. The current establishes a Lorentz-force configured to resist movement. As such, the Lorentz-force may be characterized as a vector with a component in a direction that is generally opposite the direction in which the magnet is moving. In some embodiments, the Lorentz-force vector, rather than just a component of the vector, is generally opposite the direction in which the magnet is moving. This force slows the valve member, thereby reducing forces applied to and by the valve member upon impact. In this embodiment, a current is driven through the coil both when the valve member is opening and when it is closing, but in other embodiments, only one of these movements may be slowed by driving a current through the coil.

In some embodiments, the electric device 11 adjusts the threshold pressure of the valves 20 and 20'. The threshold pressure is the fluid pressure at which the valves 20 or 20' change state, e.g. open or close. In these embodiments, the controller 136 signals the drivers 128, 130, 132, and 134 to drive a current through the coils 69 before the valves 20 or 20' change state. Depending on whether the threshold pressure is being increased or decreased, the direction of the current is selected to either hold the valve 20 or 20' in its current state, thereby increasing the threshold pressure, or drive the valve from its current state, thereby lowering threat the threshold pressure. This may adjust the capacity of the compressor 10 (FIG. 1). The magnitude of the current may be increased or decreased based on the desired change in the threshold pressure.

Figure 15:
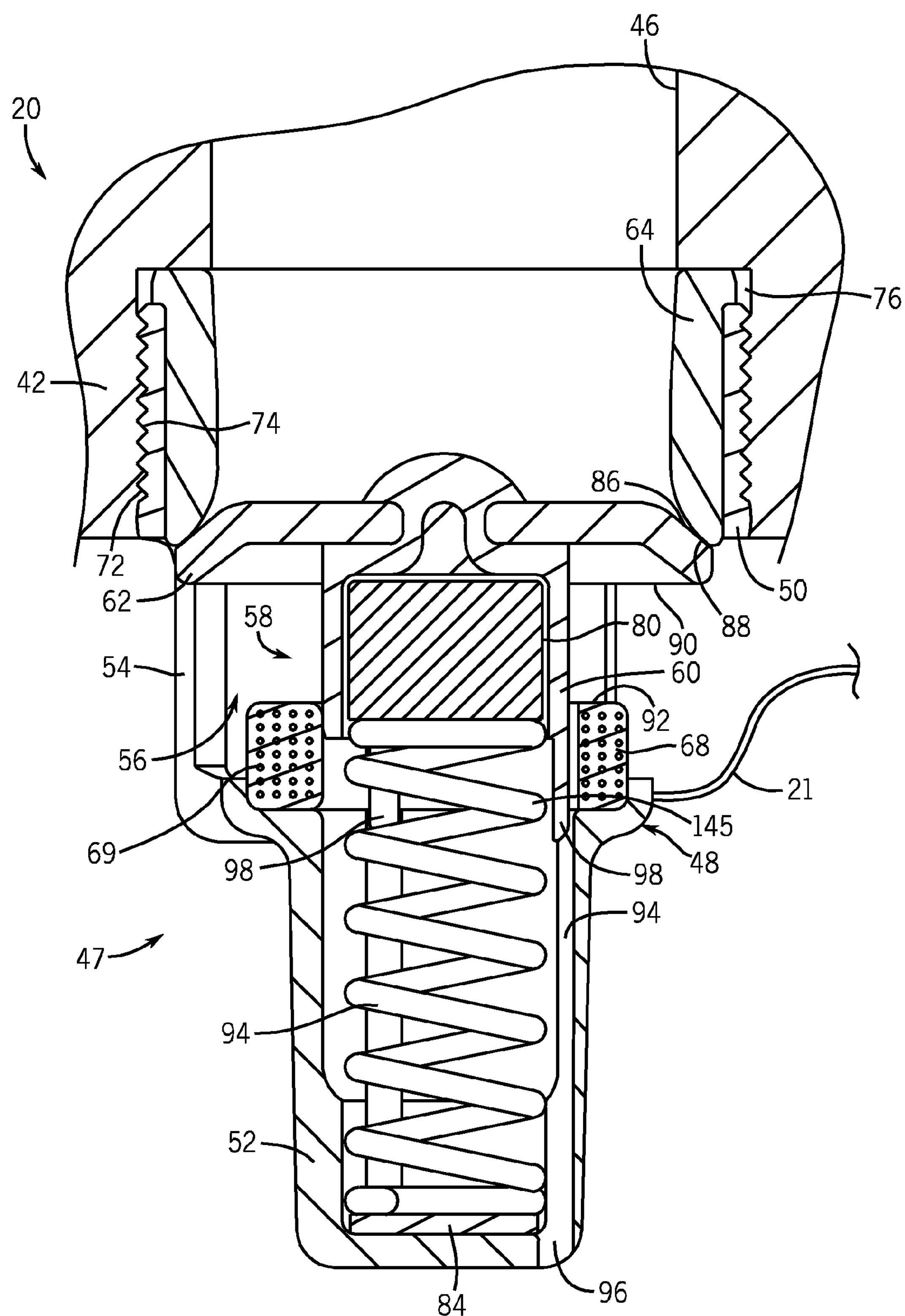
FIG. 15 is a partial, cross-section view of a second example of a poppet assembly in accordance with one embodiment of the present invention.

Other embodiments may use other configurations of valves, such as the poppet assembly 47' illustrated by FIG. 15. In this embodiment, the poppet head 62 is biased toward the pressure plate 45 by a spring 145. The illustrated spring 145 presses against the magnet 80. In some embodiments, e.g., those with a spring, the magnet 80 may be coupled to the poppet cage 48, and the coil 69 may be coupled the poppet head 62. In this arrangement, the magnet 80 may remain generally static, while the coil 69 moves with the poppet head 62.

Figure 16:
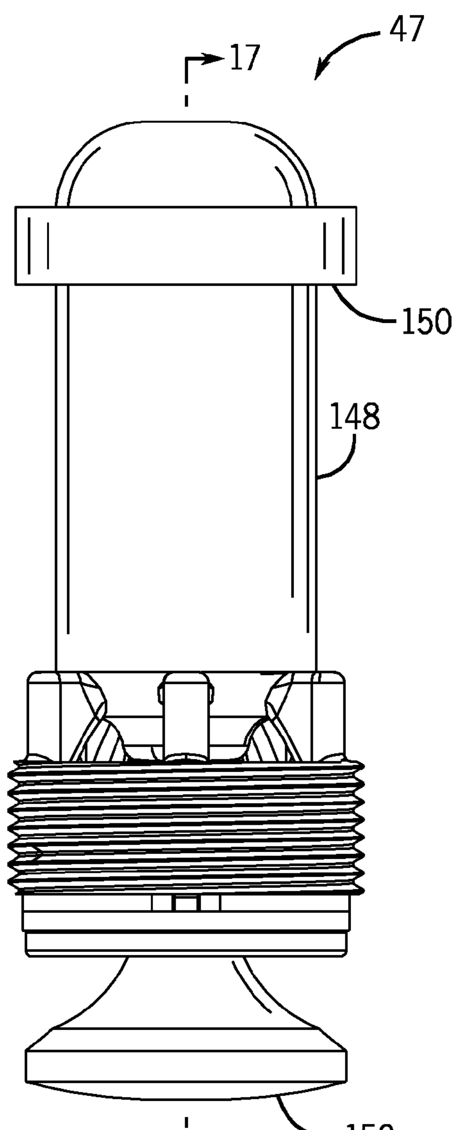
FIG. 16 is a side view of another example of a poppet assembly in accordance with one embodiment of the present invention.
Figure 17:
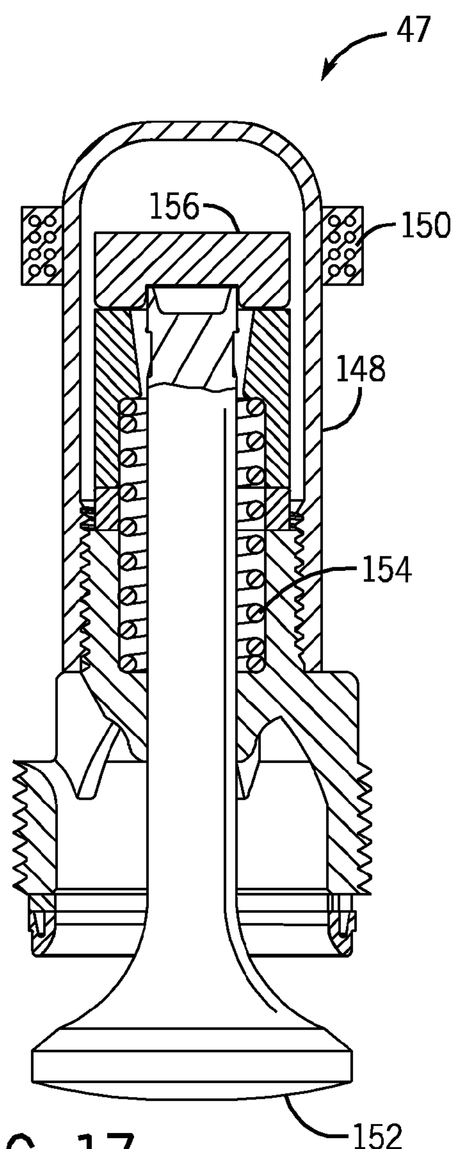
FIG. 17 is a cross-section view of the poppet assembly of FIG. 16 in accordance with one embodiment of the present invention.

FIGS. 16 and 17 illustrate another embodiment of a poppet assembly 47. In this example, the poppet assembly 47 includes a cage 148, a coil 150, a poppet 152, a spring 154, and a magnet 156. The spring 154 biases the poppet 152 toward the cage 148, and the magnet 156 is coupled to distal end of the poppet 152. The coil 150 is disposed about the cage 148 near the magnet 156. As the poppet is drawn downward by a difference in fluid pressure, the magnet 156 is moved relative to the coil 150, thereby creating an electric current. The poppet 47 may be used in one of the suction valves described above.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A compressor, comprising:

a piston; and a valve assembly, comprising:

a check valve comprising a valve member, wherein the check valve is configured to change state in response to a change in fluid pressure;

a magnet coupled to the valve member;

an impact bushing, wherein the impact bushing is configured to dampen an impact of the valve member; and an electrical conductor near the magnet, wherein the electrical conductor is imbedded within the impact bushing and configured to convert a time-varying magnetic field into a current as the magnet moves past at least a portion of the electrical conductor.

2. The compressor of claim 1, wherein the valve member comprises a poppet head.

3. The compressor of claim 1, wherein the check valve comprises a cage that receives the valve member, the magnet, and the electrical conductor.

4. The compressor of claim 1, wherein at least a portion of the conductor is disposed around at least a portion of the magnet.

5. The compressor of claim 4, wherein the conductor comprises a coil disposed about at least a portion of a path of travel of the magnet.

6. The compressor of claim 1, comprising electric device coupled to the electrical conductor.

7. The compressor of claim 6, wherein the electric device comprises an electrical energy storage device and a rectifier.

8. The compressor of claim 1, comprising: a driver with an output coupled to the electrical conductor; and a controller coupled to an input of the driver.

9. The compressor of claim 1, wherein the magnet comprises a permanent magnet.

10. The compressor of claim 1, wherein the electrical conductor comprises a coil, and wherein the coil is configured to allow the magnet to move axially around or through the coil.

11. The compressor of claim 1, wherein the valve assembly is a poppet valve assembly.

12. The compressor of claim 1, comprising a controller or monitoring circuitry configured to receive the current generated in the electrical conductor.

* * * * *